United States Patent [19]

Elias et al.

[11] Patent Number: 4,882,368

[45] Date of Patent: Nov. 21, 1989

[54] LOW COMPRESSION SET FLUOROSILICONE RUBBER

[75] Inventors: Janet L. Elias, Clareville, Australia; Chi-Long Lee; Myron T. Maxson, both of Midland, Mich.

[73] Assignee: Dow Corning Corporation, Midland, Mich.

[21] Appl. No.: 249,055

[22] Filed: Sep. 26, 1988

[51] Int. Cl.$^4$ .............................................. C08K 9/06
[52] U.S. Cl. .................................... 523/213; 523/212
[58] Field of Search ................................. 523/212, 213

[56] References Cited

U.S. PATENT DOCUMENTS

| | | | |
|---|---|---|---|
| 3,002,951 | 10/1961 | Johannson | 260/46.5 |
| 3,006,878 | 10/1961 | Talcott | 260/29.1 |
| 3,122,521 | 2/1964 | Pierce | 260/46.5 |
| 3,179,619 | 4/1965 | Brown | 260/37 |
| 3,274,153 | 9/1966 | Hyde et al. | 260/46.5 |
| 3,294,740 | 12/1966 | McVannel | 260/46.5 |
| 3,373,138 | 3/1968 | Brown | 260/46.5 |
| 3,997,496 | 12/1976 | Razzano | 260/46.5 R |
| 4,116,919 | 9/1978 | Elias et al. | 260/37 S B |
| 4,267,298 | 5/1981 | Bluestein | 528/34 |
| 4,341,888 | 7/1982 | Razzano | 528/14 |
| 4,683,277 | 7/1987 | Maxson | 528/21 |

FOREIGN PATENT DOCUMENTS

| | | |
|---|---|---|
| 174260 | 7/1987 | Japan . |
| 897305 | 5/1962 | United Kingdom . |
| 2118960 | 11/1983 | United Kingdom . |

Primary Examiner—Melvyn I. Marquis
Attorney, Agent, or Firm—Roger H. Borrousch

[57] ABSTRACT

A fluorosilicone rubber with low compression set and other physical properties which are either are not significantly effected or are improved are made by curing a composition of a polydiorganosiloxane having 3,3,3-trifluoropropylsiloxane units and endblocked with vinyl or silacyclopentenyl groups, a reinforcing silica having dimethyl(3,3,3-trifluoropropyl)siloxy units as the surface treatment, and a vinyl specific organic peroxide. The polydiorganosiloxane endblocking is done by reacting a silanol endblocked polymer with a silazane.

7 Claims, No Drawings

LOW COMPRESSION SET FLUOROSILICONE RUBBER

BACKGROUND OF THE INVENTION

1. Field of the Invention

This invention relates to fluorosilicone rubber compositions and method of making. More specifically, this invention relates to a fluorosilicone rubber which is based on fluorine-containing polydiorganosiloxane gum which is endblocked with groups contain alkenyl unsaturation.

2. Background Information

Compression set in rubber is the residual deformation of the rubber after removal of the compressive stress. Compression set is measured thirty minutes after removal from the loading device in which the specimen had been subjected for a definite time to compression deformation under specified conditions of load application and environment. Compression set is an important property for many applications of rubber, such as being used as a gasket to seal a fuel line, a fuel tank, and other equipment which might be used for distribution and holding of fuels. Fuels and solvents are very harsh environment for rubber products and certain types of rubbers have been developed for use as gasketing material, hose material, and bladder materials which come into contact with fuels and solvents. One such rubber is fluorosilicone rubber which has excellent resistance to deterioration by contact with fuels and solvents. However, fluorosilicone rubber has suffered from a high compression set which is a negative characteristic for use in many applications, such as in gasketing applications. As so often happens with materials where one wishes to improve one property, improving that property results in the decrease in one or more other properties, so that the final material chosen usually ends up in a compromised property profile.

Fluorosilicone rubber has been known for many years and has been used in the applications of fuel gaskets in spite of the high compression set. Fluorine-containing polydiorganosiloxane gums are known from Johannson U.S. Pat. No. 3,002,951, issued Oct. 3, 1961. Johannson teaches a method of preparing high molecular weight gums having perfluoroalkyl radicals on silicon from cyclic siloxane trimers. The gums prepared by Johannson's method are hydroxyl endblocked and are proposed as suitable for the preparation of rubber, a fluorosilicone rubber. Johannson is hereby incorporated by reference to show gum of perfluoroalkyl containing siloxanes and their preparation. Other gum polymers containing the perfluoroalkyl radical are shown by Hyde et al. in U.S. Pat. No. 3,274,153, issued Sept. 20, 1966; McVannel in U.S. Pat. No. 3,294,740, issued Dec. 27, 1966; and Brown in U.S. Pat. No. 3,373,138, issued Mar. 12, 1968 which are all hereby incorporated by reference to show hydroxyl endblocked polymethyl(3,3,3-trifluoropropyl)siloxane gums and their preparation. Razzano in U.S. Pat. No. 3,997,496, issued Dec. 14, 1976, teaches a method of making silanol endstopped perfluoroalkyl-substituted organopolysiloxane homopolymer or copolymers by using a non-bond-rearranging catalyst starting with low molecular weight silanol polymers. Razzano also teaches that the molecular weight of the silanol end-stopped perfluoroalkyl-substituted organopolysiloxanes can be regulated by using a very low molecular weight trimethylsiloxy and silanol end-stopped polydimethylsiloxane, where the more regulator used the lower the molecular weight of the resulting polymer and the highest molecular weight polymers are obtained without the use of regulator. Similar chain-stoppers are described by Razzano in U.S. Pat. No. 4,341,888, issued Jul. 27, 1982, in his method of making polydiorganosiloxanes.

Bluestein in U.S. Pat. No. 4,267,298, issued May 12, 1981, teaches that the preparation of triorganosilyl endstopped fluoro substituted polysiloxane fluids are very difficult to make. If one attempts to use a triorganosilyl chain stopper or regulator while making the polymers, one either proceeds directly to a high gum polymer without the chain stopper being polymerized into the polymer or the polymer does not form but only cyclotetrasiloxanes form. Bluestein teaches that a silanol endblocked polydiorganosiloxane is reacted with a triorganochlorosilane to give the endblocked polysiloxane fluids.

Bluestein et al U.K. Pat. Application No. 2,118,960, published Nov. 9, 1983, teach that silanol or aliphatic alcohol chain-stopped fluorosilicone polymers can be compounded into elastomer compositions which cure to elastomers with compression set values such as 36% (347° F./22 hours) and by the use of rare earth octoates as compression set additives can be 39.0% for silanol chain-stopped (350° F./22 hours) and 34.1% for trimethylsiloxy chain-stopped (350° F./22 hours).

Brown in U.S. Pat. No. 3,179,619, issued Apr. 20, 1965, teaches low swell organosiloxane rubbers which contain fluorinated aliphatic radicals attached to the silicon atom of the polysiloxane gum chain. Brown teaches that the use of limited amounts of vinyl containing siloxane units in the gums gives elastomers of superior compression set. Brown reports tension set values in his Example 1, but does not report any compression set values. Brown also teaches that fluorosilicone rubber with tensile strengths of 1,200 psi with elongations of 540 percent can be made using a polysiloxane gum of methyl(3,3,3-trifluoropropyl)siloxane units, fume silica, and benzoyl peroxide.

Talcott in U.S. Pat. No. 3,006,878, issued Oct. 31, 1961, teaches the preparation of fluorinated silicone rubber compositions based on gums such as described by Johannson. These fluorinated silicone rubber compositions described by Talcott are prepared by base heating a mixture of 3,3,3-trifluoropropylmethylpolysiloxane gum, silica filler such as fume silica, and 3,3,3-trifluoropropylmethylsiloxane fluid which is hydroxyl endblocked. Talcott teaches that the use of limited amounts of vinyl containing siloxane units in the gum gives elastomers of superior compression set, as was taught by Brown in U.S. Pat. No. 3,179,619, filed Jun. 27, 1956. No values for compression set are reported for the compositions described in Talcott.

Pierce in U.S. Pat. No. 3,122,521, issued Feb. 25, 1964, teaches a method of polymerizing fluoroalkyl-substituted cyclotrisiloxanes to make high molecular weight polymers. Pierce teaches that using these polymers to make compositions which cure to silicone rubber with improvement in the tear strength and an occasional improvement in the tensile strength. One fluorosilicone rubber after curing for 24 hours at 150° C. has a tensile strength at break of 1,770 psi and an elongation at break of 340 percent. The gum used to make this fluorosilicone rubber was made from 99.6 mol percent 3,3,3-trifluoropropylmethylsiloxane units and 0.4 mol percent methylvinylsiloxane units with a Williams plasticity of about 0.250 inch. Pierce reports tear strengths of 117 pounds per inch, but no compression set values are reported.

Elias et al. in U.S. Pat. No. 4,116,919, issued Sept. 26, 1978, teach a treated reinforcing silica which can be used to make silicone elastomers with improved durometer and tear strength. The silica is treated with a mixture of a hexaorganodisilazane and bis-Si-(1-methyl-1-silacyclopentenyl)amine. The silica can be treated either in situ during the manufacture of curable silicone elastomer compositions or as a separate operation. Elias et al. teach that the mixture of silazanes, silica, and triorganosiloxy endblocked polydiorganosiloxane fluid can be mixed to "in situ treat" the silica. The compositions of Elias et al. are those which contain a vinyl containing polysiloxane, the treated silica filler, organohydrogenpolysiloxane crosslinker, and a platinum catalyst. However, Elias et al. do not teach peroxide cured perfluoroalkyl containing polydiorganosiloxanes with improved compression set.

Nitzsche et al. in United Kingdom Pat. No. 897,305, published May 23, 1962 teach that diorganopolysiloxane elastomers with low compression set can be prepared from diorganopolysiloxane containing a small percentage of vinyl groups (0.05 to 1.0 mol percent), a filler which has been pretreated with an alkenyl silane or a filler which consists of a hydrolyzed and condensed vinyl or allyl trichlorosilane. These elastomers are crosslinked using peroxides or by exposure to high energy radiation.

Maxson in U.S. Pat. No. 4,683,277, issued Jul. 28, 1987, teaches the preparation of liquid diorganovinylsiloxy terminated polydiorganosiloxane of the formula

in which R* is a monovalent hydrocarbon radical R** is a perfluoroalkylethyl radical, R" is R* or R**, Vi is vinyl and p is 10 to 200. This liquid polymer is prepared by reacting a silanol terminated polydiorganosiloxane liquid with a disilazane to give the terminated liquid polymer.

Shinetsu Chem Ind KK in Japanese OPI 62/174,260, published Jul. 31, 1987, teaches fluorosilicone rubber which is made from organopolysiloxane which contains vinyl groups on a terminal and reports that the tensile strength and elongation are improved.

Reduction in compression set values of silicone rubber, including fluorosilicone rubber, has been achieved by many routes, such as by the use of metal oxides and carboxylates, and by the introduction of vinyl radical in the polymer chain. Because some of these techniques for compression set reduction are suitable for some types of silicone rubber, they do not provide satisfactory reductions for other types of silicone rubber. While it is known that the compression set values can be reduced by the use of polysiloxanes which contain small amounts of vinyl radical, still further reductions are desirable for fluorosilicone rubber.

SUMMARY OF THE INVENTION

An object of this invention is to provide a fluorosilicone rubber which has compression set values which are reduced while at the same time maintaining the other physical and solvent resistant properties at respectable values or even increasing them. It was entirely unexpected that the use of such small amounts of vinyl radical at the chain ends of polydiorganosiloxane which contains perfluoroalkyl radical could have such as a remarkable effect on the compression set values of fluorosilicone rubber and at the same time exhibiting improved tensile strengths and elongations in many cases.

This invention relates to a fluorosilicone composition comprising (A) 100 parts by weight of a polydiorganosiloxane having a general formula

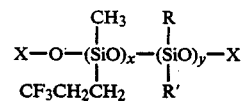

in which x has a value of at least 800, y has a value of from 0 to 20 percent of the sum of x plus y, the sum of x and y is at least 1000, each R is methyl or phenyl, each R' is vinyl or phenyl, where there is a maximum of 2 mol percent methylvinylsiloxane units in said polydiorganosiloxane, and each X is selected from the group consisting of hydrogen atom, methylphenylvinylsilyl, silyl of the formula

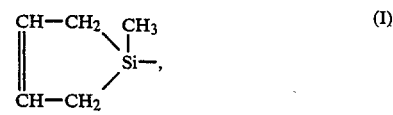

and a silyl group of the formula

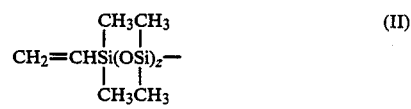

in which z has a value of from 0 to 10, at least 5 weight percent of the polydiorganosiloxane has endgroups which are endgroups of formula (I) or formula (II), (B) 5 to 100 parts by weight of a reinforcing silica filler having a surface area of at least 100 m²/g where the silica surface is hydrophobed as a result of being treated with symmetrical tetramethyldi(3,3,3-trifluoropropyl)-disilazane, combinations of symmetrical tetramethyldivinyldisilazane and symmetrical tetramethyldi(3,3,3-trifluoropropyl)disilazane, or combinations of bis-Si-(1-methyl-1-silacyclopentenyl)amine and symmetrical tetramethyldi(3,3,3-trifluoropropyl)disilazane, such that the surface has siloxy units selected from the group consisting of dimethyl(3,3,3-trifluoropropyl)siloxy units, a combination of dimethyl(3,3,3-trifluoropropyl)siloxy units and dimethylvinylsiloxy units, and a combination of dimethyl(3,3,3-trifluoropropyl)siloxy units and units of the formula

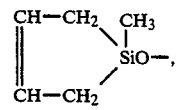

where at least 80 mol percent of the siloxy units have at least one of the organic groups which is 3,3,3-trifluoropropyl, said siloxy units being present in amounts such that there is at least 2 parts by weight of silica per part by weight of siloxy unit, and (C) a curing amount of a vinyl specific organic peroxide.

This invention also relates to a method of reducing the compression set of a fluorosilicone rubber comprising mixing fluorine-containing polydiorganosiloxane, a hydrophobed reinforcing silica filler, and an organic peroxide wherein the fluorine-containing polydiorganosiloxane has at least 5 weight percent of it endblocked by reacting a hydroxyl endblocked polydiorganosiloxane having a general formula

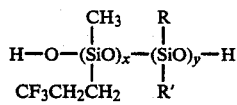

in which x has a value of at least 800, y has a value of from 0 to 20 percent of the sum of x plus y, the sum of x and y is at least 1000, each R is methyl or phenyl, each R' is vinyl or phenyl, where there is a maximum of 2 mol percent methylvinylsiloxane units in said polydiorganosiloxane, with a silazane which is present in an amount in excess of the amount sufficient to react with the hydroxyl groups of the polydiorganosiloxane where the silazane has the general formula $(X)_2NH$ in which X is a silyl selected from the group consisting of methylphenylvinylsilyl,

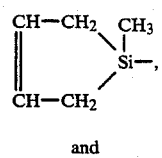 (I)

and

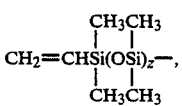 (II)

in which z has a value of from 0 to 10, heating the resulting mixture at a temperature and for a time sufficient to cause the silazane to react with the hydroxyl groups of the polydiorganosiloxane, and thereafter removing by-produced hexaorganodisiloxanes and any unreacted silazane.

DESCRIPTION OF THE EMBODIMENTS

The polydiorganosiloxane of (A) are those which contain at least 80 mol percent methyl(3,3,3-trifluoropropyl)-siloxane units with the remaining units, up to 20 mol percent, of dimethylsiloxane units, methylvinylsiloxane units, methylphenylsiloxane units, and diphenylsiloxane units. The polydiorganosiloxane of (A) can contain units other than diorganosiloxane units, such as monoorganosilsesquioxane units and $SiO_2$ units but in small amounts, such as less than one mol percent. The polydiorganosiloxane can be one type of polymer or a mixture of two or more types of polymers. The polydiorganosiloxane of (A) has endgroups where X is a hydrogen atom (also termed a silanol group) or X is a silyl unit selected from methylphenylvinylsilyl, Si-methyl-(silacyclopentenyl), or a silyl of the formula

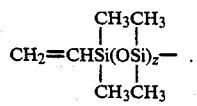 (II)

Preferably, the polydiorganosiloxane is such that at least 5 weight percent of the polydiorganosiloxane has silyl endgroups, and more preferably, 100 weight percent of the polydiorganosiloxane has silyl endgroups. The most preferred endgroup is the dimethylvinylsilyl endgroup. The best results are obtained when the silyl endgroups are obtained by reacting a hydroxyl endblocked polydiorganosiloxane and a silazane which is the appropriate precursor for the silyl endgroup desired. The mixture of hydroxyl endblocked polydiorganosiloxane and silazane are reacted in a closed (sealed) mixer by heating until the reaction is complete and then removing the ammonia which is formed from the reaction. Also removed is by-produced hexaorganosiloxanes, and any unreacted silazane.

The polydiorganosiloxane of (A) can be illustrated by dimethylvinylsilyl endblocked poly-methyl(3,3,3-trifluoro-propyl)siloxane, a mixture of dimethylvinylsilyl endblocked poly-methyl(3,3,3-trifluoropropyl)siloxane and hydroxyl endblocked poly-methyl(3,3,3-trifluoropropyl)siloxane, a mixture of dimethylvinylsilyl endblocked poly-methyl(3,3,3-trifluoropropyl)siloxane and dimethylvinylsilyl endblocked polyco{methylvinylsiloxane and methyl(3,3,3-trifluoropropylsiloxane)}, a polymer of the formula

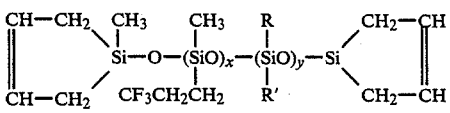

and a polymer of the formula

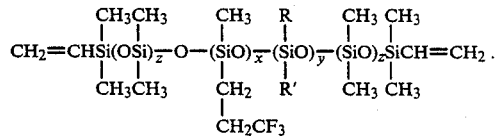

The polydiorganosiloxane of (A) are such that the value of x is at least 800, preferably at least 2,000; y is from 0 to 20 percent of the sum of x plus y, preferably y is less than one percent of the sum of x plus y; the sum of x plus y is at least 1,000, preferably at least 2,000; and z has a value of 0 to 10. In the polydiorganosiloxane of (A), the maximum amount of methylvinylsiloxane units present is 2 mol percent, preferably less than one mol percent methylvinylsiloxane units are present.

The hydroxyl endblocked polyiorganosiloxane precursors of the polydiorganosiloxane of (A) are known in the art as shown by Johannson, Hyde et al., McVannel, and Brown which are incorporated by reference to show these polymers and their preparation.

The reinforcing silica of (B) has a surface area of at least 100 square meters per gram ($m^2/g$), preferably at least 200 $m^2/g$. The reinforcing silica is available commercially and can be a fumed silica or a precipitated silica. The surface of the silica is treated with an organosilazane to produce a hydrophobic silica. The groups on the surface which make the silica hydrophobic are siloxy units in which the organic groups are methyl, vinyl, and 3,3,3-trifluoropropyl or the siloxy unit can be of the formula

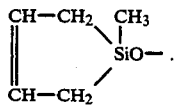

At least 80 mol percent of the siloxy units have at least one 3,3,3-trifluoropropyl group. The silica is preferably hydrophobed with symmetrical tetramethyldi(3,3,3-trifluoropropyl)disilazane. Certain combinations of silazanes can be used to treat the reinforcing silica with the achievement of some property improvement. For example, a mixture of tetramethyldi(3,3,3-trifluoropropyl)-disilazane (hereinafter referred to as fluorosilazane) and tetramethyldivinyldisilazane (hereinafter referred to as vinylsilazane) can be used to lower the compression set values but the other physical properties decrease. In these mixtures of fluorosilazane and vinylsilazane, the best overall physical properties are obtained from weight ratios of fluorosilazane to vinylsilazane of 10:1 to 30:1. However, in some applications low compression set value may be more important than a higher tensile strength or tear strength and mixtures of silazanes would be desirable. The treated reinforcing silica has a composition such that the weight ratio is at least 2 parts by weight of silica per part by weight of triorganosiloxy unit. The amount of reinforcing silica can be from 5 to 100 parts by weight per 100 parts by weight of polydiorganosiloxane (A), preferably from 15 to 55 parts by weight silica per 100 parts by weight polydiorganosiloxane (A).

The third ingredient which is necessary is a vinyl specific organic peroxide in an amount sufficient to cure the combination of (A) and (B) to form a fluorosilicone rubber. Vinyl specific peroxides include 2,5-dimethyl-2,5-di(tertiary butylperoxy)hexane and dicumyl peroxide. 2,5-dimethyl-2,5-di(tertiarybutylperoxy)hexane is preferred as the organic peroxide. The amount of organic peroxide is usually from 0.1 to 2 parts by weight based on 100 parts by weight of (A).

The fluorosilicone rubber compositions of the present invention can also contain other vinyl-containing polydiorganosiloxane fluids for the purpose of further increasing the durometer, tensile strength, and tear strength. Examples of these vinyl-containing polydiorganosiloxane fluids include a copolymer of dimethylsiloxane units and methylvinylsiloxane units which is endblocked with trimethylsiloxy units having a viscosity at 25° C. from 1,000 to 50,000 centipoise and a dimethylvinylsiloxy endblocked polymethyl(3,3,3-trifluoropropyl)siloxane fluid with from 10 to 100 units per molecule. The amounts of such fluids can be up to 25 parts by weight. Preferably, the vinyl-containing polydiorganosiloxane fluid is a copolymer of dimethylsiloxane units and methylvinylsiloxane units with methylvinylsiloxane units present in copolymer from 5 to 30 mol percent. The amounts of such copolymers are preferably present in the composition from 0.5 to 5 parts by weight per 100 parts by weight of (A).

Other ingredients which might be used in formulating the fluorosilicone rubber compositions of this invention can be used. However, one should test the influence of each of the ingredients on the properties desired in any particular end use. Some ingredients may change the solvent and fuel resistance of the elastomer, and others may change the tensile properties. These other ingredients might include fillers other than reinforcing silica, such as titanium dioxide, zinc oxide, quartz, calcium carbonate, magnesium oxide, carbon black, graphite, glass fibers, glass microspheres, alumina, and the like. Pigments and other colorants may be used. Flame retardant additives such as platinum materials, plasticizers, and other compression set additives such as the rare earth oxides and octoates.

Compositions of the present invention have the best properties when the gum of (A) is mostly dimethylvinylsiloxy endblocked with other gum, if present, being one with small amounts of pendant vinyl along the polysiloxane chain. When mixtures of gums make up (A), the gum with the pendent vinyls is present in amounts of less than 15 weight percent. The pendant vinyl is present as methylvinylsiloxane units in the gum. It was observed that curing gums with pendant vinyl and without reinforcing silica showed essentially no difference in properties between silanol endblocked gums and dimethylvinylsiloxy endblocked gums. Even when silica in the amounts of 30 parts by weight per 100 parts by weight of gum were used, the cured rubbers did not exhibit significant differences between those endblocked with silanol and those endblocked with dimethylvinylsiloxy units. Even treating the silica filler did not show any significant differences in the cured properties. Compositions made with gums which only had vinyl at the chain end i.e. endblocked with dimethylvinylsiloxy units, show significant differences in the cured properties between silanol endblocked and the dimethylvinylsiloxy endblocked gums when treated reinforcing silica was present and a vinyl specific peroxide was used. In the silica filler compositions containing gum with alkenyl unsaturation at the chain terminals, differences were observed when different kinds of endblockers were used. It was found that the best properties were obtained when the gum was a blend of at least one gum endblocked with dimethylvinylsiloxy units which were obtained from reaction of silanol endblocked polymethyl(3,3,3-trifluoropropyl)siloxane and at least one other gum which was endblocked with dimethylvinylsiloxy units which was obtained from the reaction of silanol endblocked polydiorganosiloxane having at least 98 mol percent methyl-(3,3,3-trifluoropropyl)siloxane units and from 0.05 to 2 mol percent methylvinylsiloxane units and tetramethyldivinyldisilazane, reinforcing silica with a surface treatment using tetramethyldi(3,3,3-trifluoropropyl)disilazane, a vinyl-containing polydiorganosiloxane fluid, and a vinyl specific organic peroxide. Compositions which contain treated reinforcing silica filler which has been treated with tetramethyldi(3,3,3-trifluoropropyl)disilazane and small amounts of tetramethyldivinyldisilazane (less than 15 weight percent of the total treatment) exhibit increased durometers at the same filler loading. Increasing the reinforcing silica filler content in the composition will also increase the durometer.

The fluorosilicone rubber compositions of this invention exhibit low compression set along with superior tensile strength at break, improved elongation at break and tear strength as measured by ASTM-D624, Die B. In many compositions where the only difference is that the silanol (SiOH) endblocked gum is endblocked with dimethylvinylsiloxy units derived from being endcapped with tetramethyldivinyldisilazane, the tensile strength at break and the tear strength are substantially increased with the compression set being substantially lowered. Gums which were endcapped by reacting the silanol endcapped gums with dimethylvinyl(N- methylacetamide)silane did not give the superior results where fluorosilicone rubber compositions were prepared as described herein. The compositions of the present invention are more stable and do not exhibit the crepe hardening phenomenon to the extent that gums with either silanol endblocking groups or with groups other than made by the use of tetramethyldivinyldisilazane. The combination of gums endblocked with dimethylvinylsiloxy units (via the silazane), reinforcing silica treated with tetramethyldi(3,3,3-trifluoropropyl)disilazane, and a vinyl specific peroxide give the improve properties described herein. Reinforcing silica which also contain some tetramethyldivinylsilazane in the treatment results in a further reduction in compression set.

The following examples are for illustrative purposes only and should not be construed as limiting the invention which is properly delineated in the claims. In the examples, "parts" is parts by weight and the viscosities are at 25° C. unless otherwise stated.

EXAMPLE 1

Preparation of Dimethylvinylsiloxy Endblocked Gums

The dimethylvinylsiloxy endblocked polydiorganosiloxane gums were prepared in the following manner: Polydiorganosiloxane gum was placed in a two-gallon dough type mixer, tetramethyldivinyldisilazane was added, the mixer was closed (sealed), then mixed for one hour at room temperature (about 25° C.), the contents of the mixer was heated at 150° C. for one hour with continuous mixing, mixing was continued for another 15 to 30 minutes while drawing a vacuum to reduce the pressure to 25 inches of Hg to remove the ammonia, mixing was continued for another 15 to 30 minutes to cool to 25° C. while maintaining the vacuum to hold the pressure at 25 inches of Hg, the cooled gum was removed from the mixer, placed in an open pan and devolatilized in a hot air oven for 4 to 16 hours at 100° C. The resulting polydiorganosiloxane gum was endblocked with dimethylvinylsiloxy groups.

Preparation of Fluorosilicone Rubber Composition

Fluorosilicone rubber compositions were prepared by placing in a one pint dough type mixer with a sigma blade, 250 parts of polydiorganosiloxane gum (referred to hereinafter as "Gum") as described below, 7.5 parts of a copolymer of 78 mol percent dimethylsiloxane units and 22 mol percent methylvinylsiloxane units endblocked with trimethylsiloxy units having a viscosity of about 20,000 centipoise, and 5 parts of water. The contents of the mixer were mixed for 5 minutes and then 37.5 parts of tetramethyldi(3,3,3-trifluoropropyl)disilazane was added and mixed for 5 minutes, and then 27.5 parts of reinforcing silica having surface area of about 400 m$^2$/g was added followed by masticating for 5 to 10 minutes to disperse the silica in the mixture. The reinforcing silica was added in 27.5 part increments, each time masticating until 110 parts of silica was added. After all the silica was added, the masticating was continued for another 15 minutes. The mixer was heated and vented, about 30 minutes until 150° to 175° C. was reached. The contents were then maintained at 150° to 175° C. for one hour while drawing a vacuum to reduce the pressure to 25 inches of Hg. The resulting mixture was cooled with masticating and the vacuum was maintained, about 30 minutes. The cooled mixture (base) was catalyzed with 1 part of 2,5-dimethyl-2,5-(tertiarybutylperoxy)hexane per 100 parts of the base. Test specimens were prepared by curing the catalyzed base in a press mold for 10 minutes at 171° C., followed by heating for 8 hours at 200° C. in a hot air oven.

Gum A was a hydroxyl endblocked (HOSi) polymethyl(3,3,3-trifluoropropyl)siloxane having a Williams plasticity in the range of 0.090 to 0.140 inch.

Gum B was a hydroxyl endblocked poly-co{methyl(3,3,3-trifluoropropyl)siloxane-methylvinylsiloxane} having 99.4 mol percent methyl(3,3,3-trifluoropropyl)siloxane units and 0.6 mol percent methylvinylsiloxane units and a William plasticity in the range of 0.090 to 0.110 inch.

Gum C was a dimethylvinylsiloxy endblocked polymethyl(3,3,3-trifluoropropyl)siloxane as prepared by the method described above for the preparation of the endblocked gums using Gum A as the starting hydroxyl endblocked gum.

Gum D was a dimethylvinylsiloxy endblocked poly-co{methyl(3,3,3-trifluoropropyl)siloxane-methylvinylsiloxane} as prepared by the method described above for the preparation of endblocked gums using Gum B as the starting hydroxyl endblocked gum.

The cured specimens were prepared in accordance with the specific test requirements for measuring a property. The tests were:

Durometer, on the Shore A scale, was determined according to ASTM-D2240.

Tensile strength at break in pound per square inch (psi), elongation at break in percent, and modulus at 100% elongation in psi were measured according to ASTM-D412.

Tear strength, Die B, in pounds per inch (ppi) was measured according to ASTM-D624.

Compression set in percent was determined according to ASTM-D395 with the conditions being 22 hours at 177° C.

Bashore was determined according to ASTM-D2632.

Plasticity was determined according to ASTM-D926 and the results are in inches. This test was modified according to the following: A sample weighing either twice the specific gravity (in grams) of material containing a filler or four times the specific gravity (in grams) of unfilled gum was cut from larger test specimens of material and rolled into a ball. The material, in the shape of a ball, was then allowed to age for one hour at 23° C. ±1° C. The sample was then placed between the platens of a plastometer (Catalog No. C544445 Parallel Plate Plastometer, Scott Tester, Inc., Providence, R.I.) and the upper plate was lowered until it just touched the top of the sample and was then released without dropping it. The plasticity reported was the thickness of the sample 3 minutes ±5 seconds after the release of the upper platen when the sample was at 23° C. ±1° C.

The results of the compositions prepared were as shown in Table I. Samples Numbers 1, 2, 3, 7, 10, and 13 are present for comparative purposes.

TABLE I

| SAMPLE | GUM KIND | GUM AMOUNT | BASE PLASTICITY | DUROMETER | TENSILE | ELONGATION | TEAR STRENGTH | COMPRESSION SET | BASHORE |
|---|---|---|---|---|---|---|---|---|---|
| 1 | A | 225 | 113 | 30 | 1049 | 640 | 276 | 426 | 13 |
|   | B | 25 |   |   |   |   |   |   |   |

TABLE I-continued

| SAM-PLE | GUM KIND | GUM AMOUNT | BASE PLASTICITY | DURO-METER | TENSILE | ELON-GATION | TEAR STRENGTH | COMPRESSION SET | BASHORE |
|---|---|---|---|---|---|---|---|---|---|
| 2 | A | 225 | 175 | 49 | 1324 | 468 | 234 | 24 | 10 |
|   | B | 25 |   |   |   |   |   |   |   |
| 3* | A | 225 | 173 | 53 | 1486 | 303 | 150 | 44 | 13 |
|   | B | 25 |   |   |   |   |   |   |   |
| 4 | A | 225 | 130 | 35 | 1186 | 571 | 310 | 28.7 | 14 |
|   | D | 25 |   |   |   |   |   |   |   |
| 5 | C | 225 | 127 | 41 | 1425 | 490 | 308 | 16.2 | 16 |
|   | B | 25 |   |   |   |   |   |   |   |
| 6 | C | 225 | 168 | 53 | 1556 | 480 | 278 | 20 | 10 |
|   | B | 25 |   |   |   |   |   |   |   |
| 7* | C | 225 | 171 | 53 | 1685 | 402 | 214 | 40 | 13 |
|   | B | 25 |   |   |   |   |   |   |   |
| 8 | C | 225 | 18 | 38 | 1402 | 499 | 274 | 12.4 | 15 |
|   | D | 25 |   |   |   |   |   |   |   |
| 9 | C | 225 | 172 | 46 | 1621 | 502 | 263 | 21 | 10 |
|   | D | 25 |   |   |   |   |   |   |   |
| 10* | C | 225 | 173 | 53 | 1759 | 388 | 162 | 38 | 12 |
|   | D | 25 |   |   |   |   |   |   |   |
| 11** | C | 225 | — | 61 | 1386 | 275 | 161 | 14 | — |
|   | D | 25 |   |   |   |   |   |   |   |
| 12** | C | 225 | 167 | 67 | 1214 | 299 | 142 | 11 | 17 |
|   | D | 25 |   |   |   |   |   |   |   |
| 13** | A | 225 | 176 | 68 | 1009 | 280 | 107 | 15 | 18 |
|   | B | 25 |   |   |   |   |   |   |   |

*1 part pf peroxide paste 50 weight percent benzoyl peroxide and 50 weight percent of 1,000 centistoke trimethylsiloxy endblocked polydimethylsiloxane fluid used in place of 2,5-dimethyl-2,5-di(tertiarybutylperoxy)hexane. Benzoyl peroxide is a non-vinyl specific peroxide.
**The procedure for making the base was as described above except one part of tetramethyldivinyldisilazane was added with the 37.5 parts of tetramethyldi-(3,3,3-trifluoropropyl)disilazane. In Sample 11, the amount of silica was 125 parts and the amount of tetramethyldi-(3,3,3-triflurorpropyl)disilazane was 42.2 parts.

EXAMPLE 2

Bases were prepared as described in Example 1 except the gums were as follows:

Gum E was prepared as described in Example 1 using Gum A and a silazane of the following formula

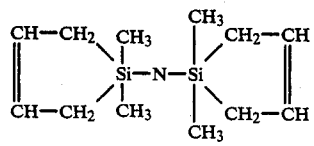

was used.

Gum F was prepared as described in Example 1 except Gum B and the silazane of the formula used for making Gum E was used.

Gum G was prepared as described in Example 1 except Gum A and bis(methylphenylvinylsilyl)amine was used.

Gum H was prepared as described in Example 1 except Gum B and bis(methylphenylvinylsilyl)amine was used.

Gum I was prepared as described in Example 1 except Gum A and a silazane of the formula

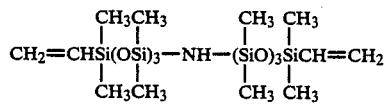

was used.

Gum J was prepared as described in Example 1 except Gum A and a silazane of the formula described for Gum K was used.

Test specimens were prepared from bases prepared as described in Example 1 using the gums as shown in Table II. The physical properties were determined as described in Example 1 and the results were as shown in Table II. Sample 14 is presented for comparative purposes.

TABLE II

| SAM-PLE | GUM KIND | GUM AMOUNT | BASE PLASTICITY | DURO-METER | TENSILE | ELON-GATION | TEAR STRENGTH | COMPRESSION SET | BASHORE |
|---|---|---|---|---|---|---|---|---|---|
| 14 | A | 225 | 175 | 49 | 1324 | 468 | 234 | 24 | 10 |
|   | B | 25 |   |   |   |   |   |   |   |
| 15 | C | 225 | 118 | 38 | 1402 | 499 | 274 | 12.4 | 15 |
|   | D | 25 |   |   |   |   |   |   |   |
| 16 | E | 225 | 161 | 53 | 1484 | 445 | 261 | 22 | 9 |
|   | F | 25 |   |   |   |   |   |   |   |
| 17 | G | 225 | 175 | 58 | 1556 | 460 | 262 | 22 | 11 |
|   | H | 25 |   |   |   |   |   |   |   |
| 18 | I | 225 | 166 | 61 | 1581 | 482 | 275 | 21 | 12 |
|   | J | 25 |   |   |   |   |   |   |   |

EXAMPLE 3

Base A was prepared as described in Example 1 except that 85 parts of Gum C, 15 parts of a dimethylvinylsiloxy endblocked polymethyl(3,3,3-trifluoropropyl)siloxane fluid having an average of 50 siloxane units per molecule, 42.7 parts of reinforcing silica having a surface area of about 400 m²/g, and 14.6 parts of tetramethyl-di(3,3,3-trifluoropropyl)disilazane.

Base B was prepared as described above for Base A, except that 0.47 part of bis-Si-(1-methyl-1-silacyclopentenyl)-amine was also added.

Base C was prepared as described above for Base A except that 0.47 part of tetramethyldivinyldisilazane was also added.

The bases were cured by adding one part of 2,5-dimethyl-2,5-di(tertiarybutylperoxy)hexane, made into test specimens, and tested according to the description in Example 1. The results were as shown in Table III.

TABLE III

| SAMPLE | BASE | BASE PLASTICITY | DUROMETER | TENSILE | 100% MODULUS | ELONGATION | TEAR STRENGTH | COMPRESSION SET | BASHORE |
|---|---|---|---|---|---|---|---|---|---|
| 19 | A | 138 | 52 | 1589 | 218 | 436 | 242 | 18 | 10 |
| 20 | B | 145 | 55 | 1569 | 245 | 425 | 291 | 15 | 18 |

EXAMPLE 4

A fluorosilicone rubber composition was prepared as described in Example 1 in which the bases were as follows: Base C was prepared from 100 parts of Gum C, 5 parts of the copolymer as described in Example 1, 28 parts of reinforcing fumed silica having a surface area of 250 m²/g, 11 parts of tetramethyldi(3,3,3-trifluoropropyl)disilazane, and 1 part of water. Base D was prepared for comparative purposes as described for Base C except that Gum A was used in place of Gum C. These bases were mixed with 1 part of 2,5-dimethyl-2,5-di(tertiarybutylperoxy)hexane, cured and made into specimens as described in Example 1. The tests results were as shown in Table IV:

TABLE IV

| PROPERTY | FLUOROSILICONE RUBBER MADE WITH | |
|---|---|---|
| | BASE C | BASE D |
| TENSILE STRENGTH AT BREAK, PSI | 1316 | 885 |
| ELONGATION AT BREAK, % | 655 | 615 |
| TEAR STRENGTH DIE B, PPI | 162 | 132 |
| DUROMETER, SHORE A | 30 | 29 |
| COMPRESSION SET, 22 HOURS @ 177° C. | 14.9 | 32.2 |

This example illustrates the significant improvement in the properties of gums with dimethylvinylsiloxy endgroups made from the corresponding silazane over gums with silanol endgroups.

That which is claimed is:

1. A fluorosilicone composition comprising
(A) 100 parts by weight of a polydiorganosiloxane having a general formula

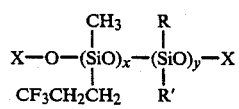

in which x has a value of at least 800, y has a value of from 0 to 20 percent of the sum of x plus y, the sum of x and y is at least 1000, each R is methyl or phenyl, each R' is vinyl or phenyl, where there is a maximum of 2 mol percent methylvinylsiloxane units in said polydiorganosiloxane, and each X is selected from the group consisting of hydrogen atom, methylphenylvinylsilyl, silyl of the formula

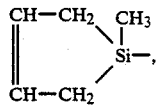

and a silyl group of the formula

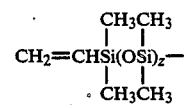

in which z has a value of from 0 to 10, at least 5 weight percent of the polydiorganosiloxane has endgroups which are endgroups of formula (I) or formula (II),
(B) 5 to 100 parts by weight of a reinforcing silica filler having a surface area of at least 100 m²/g where the silica surface is hydrophobed as a result of being treated with symmetrical tetramethyldi(3,3,3-trifluoropropyl)disilazane, combinations of symmetrical tetramethyldivinyldisilazane and symmetrical tetramethyldi(3,3,3-trifluoropropyl)disilazane, or combinations of bis-Si-(1-methyl-1-silacyclopentenyl)amine and symmetrical tetramethyldi(3,3,3-trifluoropropyl)disilazane, such that the surface has siloxy units selected from the group consisting of dimethyl(3,3,3-trifluoropropyl)siloxy units, a combination of dimethyl(3,3,3-trifluoropropyl)siloxy units and dimethylvinylsiloxy units, and a combination of dimethyl(3,3,3-trifluoropropyl)siloxy units and units of the formula

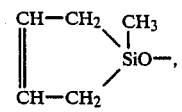

where at least 80 mol percent of the siloxy units have at least one of the organic groups which is 3,3,3-trifluoropropyl, said siloxy units being present in amounts such that there is at least 2 parts by weight of silica per part by weight of siloxy unit, and
(C) a curing amount of a vinyl specific organic peroxide.

2. The fluorosilicone rubber composition according to claim 1 in which the polydiorganosiloxane of (A) contains at least 99 mol percent methyl(3,3,3-trifluoropropyl)siloxane units and up to one mol percent methylvinylsiloxane units and at least 10 weight percent of the polydiorganosiloxane has terminal units which are dimethylvinylsilyl groups and any remaining endgroups are hydrogen atom, and the reinforcing silica of (B) is treated with symmetrical tetramethyldi(3,3,3-trifluoropropyl)disilazane to provide surface groups of dimethyl(3,3,3-trifluoropropyl)siloxy units.

3. The fluorosilicone rubber composition according to claim 2 in which the polydiorganosiloxane is endblocked with dimethylvinylsilyl groups by reaction of a sufficient amount of symmetrical tetramethyldivinyldisilazane with hydroxyl endblocked polydiorganosiloxane to completely endblock the polydiorganosiloxane with dimethylvinylsilyl groups.

4. The fluorosilicone rubber composition according to claim 1 further comprising (D) a vinyl-containing polydiorganosiloxane being selected from the group consisting of a copolymer having 70 to 95 mol percent dimethylsiloxane units and 5 to 30 mol percent methylvinylsiloxane units and endblocked with trimethylsiloxy units having a viscosity at 25° C. of 1,000 to 50,000 centipoise, and a polymethyl(3,3,3-trifluoropropyl)-siloxane having from 10 to 100 units per molecule and being endblocked with dimethylvinylsiloxy groups.

5. The fluorosilicone rubber composition according to claim 2 further comprising (D) a vinyl-containing polydiorganosiloxane being selected from the group consisting of a copolymer having 70 to 95 mol percent dimethylsiloxane units and 5 to 30 mol percent methylvinylsiloxane units and endblocked with trimethylsiloxy units having a viscosity at 25° C. of 1,000 to 50,000 centipoise, and a polymethyl(3,3,3-trifluoropropyl)-siloxane having from 10 to 100 units per molecule and being endblocked with dimethylvinylsiloxy groups.

6. The fluorosilicone rubber composition according to claim 3 further comprising (D) a vinyl-containing polydiorganosiloxane being selected from the group consisting of a copolymer having 70 to 95 mol percent dimethylsiloxane units and 5 to 30 mol percent methylvinylsiloxane units and endblocked with trimethylsiloxy units having a viscosity at 25° C. of 1,000 to 50,000 centipoise, and a polymethyl(3,3,3-trifluoropropyl)-siloxane having from 10 to 100 units per molecule and being endblocked with dimethylvinylsiloxy groups.

7. A method of reducing the compression set of a fluorosilicone rubber comprising mixing fluorine-containing polydiorganosiloxane, a hydrophobed reinforcing silica filler, and an organic peroxide wherein the fluorine-containing polydiorganosiloxane has at least 5 weight percent of it endblocked by reacting a hydroxyl endblocked polydiorganosiloxane having a general formula

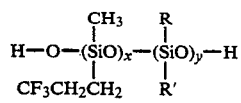

in which x has a value of at least 800, y has a value of from 0 to 20 percent of the sum of x plus y, the sum of x and y is at least 1000, each R is methyl or phenyl, each R' is vinyl or phenyl, where there is a maximum of 2 mol percent methylvinylsiloxane units in said polydiorganosiloxane, with a silazane which is present in an amount in excess of the amount sufficient to react with the hydroxyl groups of the polydiorganosiloxane where the silazane has the general formula $(X)_2NH$ in which X is a silyl selected from the group consisting of methylphenylvinylsilyl,

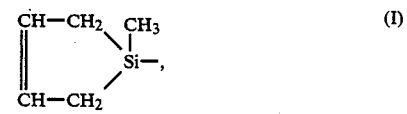

and

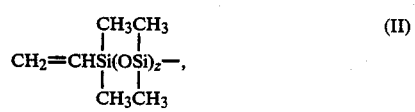

in which z has a value of from 0 to 10, heating the resulting mixture at a temperature and for a time sufficient to cause the silazane to react with the hydroxyl groups of the polydiorganosiloxane, and thereafter removing by-produced ammonia, hexaorganodisiloxanes, and any unreacted silazane.

* * * * *